(12) United States Patent  (10) Patent No.: US 9,387,744 B2
Grandgirard et al.  (45) Date of Patent: Jul. 12, 2016

(54) WINDOW WITH ENCAPSULATED PROFILED JOINT AND INSERT ATTACHED TO THE JOINT, ATTACHMENT ELEMENT OF THE INSERT FOR THE WINDOW AND WINDOW MANUFACTURING METHOD

(71) Applicant: SAINT-GOBAIN GLASS FRANCE, Courbevoie (FR)

(72) Inventors: Bastien Grandgirard, Marqueglise (FR); Nicolas Coutellier, Compiegne (FR); Romain Gonnet, Lacroix Saint Ouen (FR); Yoann Machizaud, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/431,126

(22) PCT Filed: Sep. 24, 2013

(86) PCT No.: PCT/FR2013/052225
§ 371 (c)(1),
(2) Date: Mar. 25, 2015

(87) PCT Pub. No.: WO2014/049256
PCT Pub. Date: Apr. 3, 2014

(65) Prior Publication Data
US 2015/0251523 A1  Sep. 10, 2015

(30) Foreign Application Priority Data

Sep. 25, 2012  (FR) ..................................... 12 58981

(51) Int. Cl.
*B60J 10/00* (2016.01)
*B60J 1/00* (2006.01)
*B60J 10/02* (2006.01)

(52) U.S. Cl.
CPC *B60J 1/007* (2013.01); *B60J 1/006* (2013.01); *B60J 1/008* (2013.01); *B60J 10/00* (2013.01); *B60J 10/02* (2013.01); *B60J 10/27* (2016.02); *Y10T 403/7005* (2015.01)

(58) Field of Classification Search
CPC ........ B60J 1/007; B60J 1/008; B60J 10/0065; B60J 10/0054; B60J 1/006; B60J 10/0062; B60J 10/02; B60J 10/008; B60J 10/0051; B60J 10/0022; Y10T 403/7005; B60R 13/04; B60R 13/06
USPC ......... 52/716.5, 208, 204.53; 296/93, 146.15; 49/475.1
See application file for complete search history.

(56) References Cited

U.S. PATENT DOCUMENTS 3,895,468 A * 7/1975 Bernstein .............. F16B 5/0692
160/395
3,897,967 A * 8/1975 Barenyi .................. B60R 13/04
114/219

(Continued)

FOREIGN PATENT DOCUMENTS

DE  10 2005 054 721 A1  5/2007
JP  63-203443  8/1988
WO  WO 2009019548 A2 *  2/2009  ........... B60J 10/0062

OTHER PUBLICATIONS

International Search Report Issued Dec. 10, 2013 in PCT/FR13/052225 Filed Sep. 24, 2013.

*Primary Examiner* — Robert Canfield
*Assistant Examiner* — Babajide Demuren
(74) *Attorney, Agent, or Firm* — Oblon, McClelland, Maier & Neustadt, L.L.P.

(57) ABSTRACT

The present invention relates to a window (1) including a glazing element (2), at least one profiled joint portion (3), at least one insert (4) such as a trim element, and at least one attachment element (5) for attaching said insert (4) to said profiled joint portion (3), said insert (4) having an inside face (41) with retaining flanges (40, 40'), and said attachment element (5) having a base (50), a head (52) and a body (51) arranged between this base and this head.

15 Claims, 3 Drawing Sheets

(56) References Cited

U.S. PATENT DOCUMENTS

| | | | |
|---|---|---|---|
| 4,750,781 A * | 6/1988 | Betteridge | B60J 7/1642 24/297 |
| 5,561,003 A | 10/1996 | Nowosiadly | |
| 5,846,631 A | 12/1998 | Nowosiadly | |
| 7,918,058 B2 * | 4/2011 | Debailleul | B60J 10/0022 52/208 |
| 8,640,385 B2 * | 2/2014 | Sawatani | B60R 13/04 49/492.1 |
| 2002/0043041 A1 * | 4/2002 | Yoyasu | B60R 13/04 52/716.5 |
| 2003/0075949 A1 | 4/2003 | Kanie et al. | |
| 2003/0110732 A1 * | 6/2003 | Vance | E06B 1/30 52/716.5 |
| 2009/0007498 A1 * | 1/2009 | Araki | B60J 10/0062 49/483.1 |
| 2009/0007511 A1 | 1/2009 | Hause | |
| 2010/0024328 A1 * | 2/2010 | Bissinger | B60J 1/006 52/208 |

* cited by examiner

WINDOW WITH ENCAPSULATED PROFILED JOINT AND INSERT ATTACHED TO THE JOINT, ATTACHMENT ELEMENT OF THE INSERT FOR THE WINDOW AND WINDOW MANUFACTURING METHOD

BACKGROUND

The present invention relates to an attachment element of an insert, such as a trim element, on a window, in particular a window used in a vehicle. The present invention also relates to windows using such an attachment element and the method for manufacturing the corresponding window.

Throughout this document, the expression "insert" refers to an accessory of the window, in particular an elongated accessory; it does not refer to a vehicle bodywork element.

It is known that to aesthetically improve certain windows, in particular windows used in the motor vehicle sector, trim elements are used, commonly comprising profiles that are clipped onto clips that are attached to a profiled bead, made for example of a soft polymer, which is overmolded onto each window, in particular around the edge of the latter.

An intermediate attachment device of the type described above is known from international application WO 2007/003823.

According to this document, the upstream cooperating part includes at least one protruding male element or one recessed female element, this element cooperating respectively with a corresponding recessed female element or a protruding male element formed in the profiled bead, said recessed female element having inside dimensions at least partially smaller than the outside dimensions of said protruding male element.

This results in tenon-mortise cooperation, generating a friction effect between at least some of the surfaces of the elements.

A significant advantage of this device over the existing device lies in the reliability of the attachment system: it enables the trim profile to be held reliably, including under extreme conditions, in particular vibration.

However, this system complicates the design of the profiled bead and requires the design of a specific profiled bead that has specific male or female zones.

Furthermore, this system is not entirely satisfactory if the insert has a complex shape.

Indeed, with this system and with other systems in the prior art, it is possible to clip on an insert extending along one or two edges of the window, but it is very difficult to clip on an insert extending along at least three edges of the window.

The prior art, specifically patent application DE 10 2005 054 721, includes a system for attaching an insert using an attachment element having two different heads that pass through the profiled bead, each one holding, along the width thereof, a retention flange of the insert.

This system is noteworthy in that the width of the attachment element measured at the heads thereof is greater than the width of the hole in the profiled bead; this width of the attachment element measured at the heads thereof must be forced through the hole, exploiting the flexibility of the body of one of the heads.

This system is not sufficiently reliable because it relies on two contradictory features: the distance between the extremities of the two heads along the width thereof (i.e. the width of the attachment element at the level of the heads thereof) must be large enough to best hold the retaining flanges, but this distance must not be so large as to enable both heads to pass through the width of the hole in the profiled bead.

If the width of the attachment element measured at the heads thereof is large, the insert will be well held, but it will be very difficult to remove the attachment element; conversely, if the width of the attachment element measured at the heads thereof is small, it is easy to remove the attachment element, but the insert will not be sufficiently well held.

BRIEF SUMMARY

The present invention is intended to overcome the drawbacks of the prior art by proposing an attachment element that makes it possible to attach, precisely, efficiently and removably, at least one insert, in particular a trim element, to a profiled bead of a window, said trim element having a complex shape, using at least one intermediate element attached removably (i.e. non-permanently) to the insert.

The present invention is intended in particular to enable the quick and reliable attachment of an insert, and in particular a complex insert, without this insert or the attachment element being too complex.

The present invention is therefore based on a solution in which the intermediate part is key shaped, and a part thereof is passed through the hole made in the profiled bead, this part then holding the flanges of the insert by rotating the intermediate part about itself.

The present invention therefore relates to a window. This window includes a glazing element, at least one profiled joint portion, at least one insert such as a trim element, and at least one attachment element for attaching said insert to said profiled joint portion, said insert having an inside face with retaining flanges. These retaining flanges are arranged along two opposing longitudinal edges of the inside face of the insert.

According to the invention, said profiled joint portion includes at least one hole beneath said insert opening onto an inside face and an outside face of said joint, said hole being longer than it is wide, said attachment element having a single base, a single head and a single body that is arranged between this base and this head, in which:

the body is no wider than the width of the hole the head is narrower than the width of the hole in a first direction and shorter than the length of the hole, while being longer than the width of the hole in a second direction the base is wider than the width of the hole in said first direction and in said second direction said first direction and said second direction are in the same plane and preferably perpendicular in this plane the width of the head is less than the distance between the lateral extremities of the retaining flanges such that this width can pass between these flanges and the length of the head is greater than the distance between the lateral extremities of the retaining flanges such that said head holds, along the length thereof, said retaining flanges (and therefore the insert) in the direction of the outside surface of the profiled bead.

Thus, according to the invention, by passing the head of the attachment element through the hole made in the profiled bead, then passing the width of the head between the retaining flanges, then turning the attachment element about itself, the width of the head then faces the retaining flanges of the insert and the length of the head holds the flanges of the insert.

To properly attach the insert, the height of the body of the attachment element should also preferably be equal to the distance between the retaining flanges and the hole on the inside face of said joint.

The removable attachment of the insert is precise and reliable, even if the insert has a complex shape.

In a variant of the invention, said body of the attachment element has an axis and the cross-section perpendicular to this axis is circular; accordingly, the body can turn unhindered in the hole made in the profiled bead.

In another separate variant, the inside surface of said hole has two recesses, preferably facing one another across the width of said hole, in order to create a seat for the base of the attachment element that is recessed in the direction of the insert; thus, the base, and consequently the insert, is prevented from rotating when it is in this seat.

In another separate variant, the hole has a perimeter made of a perimeter part different from said profiled joint.

In this variant, said perimeter part has two recesses on the inside surface, which are preferably facing one another across the width of said hole and said perimeter part has two recesses on the outside surface, which both preferably face one another across the width of said hole.

In a very specific separate variant, said insert has an overall arc or U shape with a central part and a return part at each extremity of the central part (which extend in the same direction) and said window has at least two holes and at least two inserts with at least one hole/insert pair for each return part.

The present invention also relates to an attachment element for a window according to the invention, said attachment element having 4 base, a head and a body arranged between this base and this head.

The present invention also relates to a method for manufacturing a window according to the invention, said window including a glazing element, at least one profiled joint portion, at least one insert such as a trim element, and at least one attachment element for attaching said insert to said profiled joint portion.

According to this method, said head of said attachment element is passed through the hole of said profiled joint portion, then the attachment element is turned about itself.

Preferably, to pass said head through said hole, said head is inserted into the hole via the inside surface and comes out of the hole via the outside surface.

Also preferably, the attachment element is turned about itself by an angle of 90°.

BRIEF DESCRIPTION OF THE DRAWINGS

Several embodiments of the present invention are described below by way of non-limiting examples, with reference to the attached drawings in which.

In these figures, the proportions between the different elements are respected in each figure, but the background elements are not usually shown, so as to facilitate comprehension.

DETAILED DESCRIPTION

Figure 1:
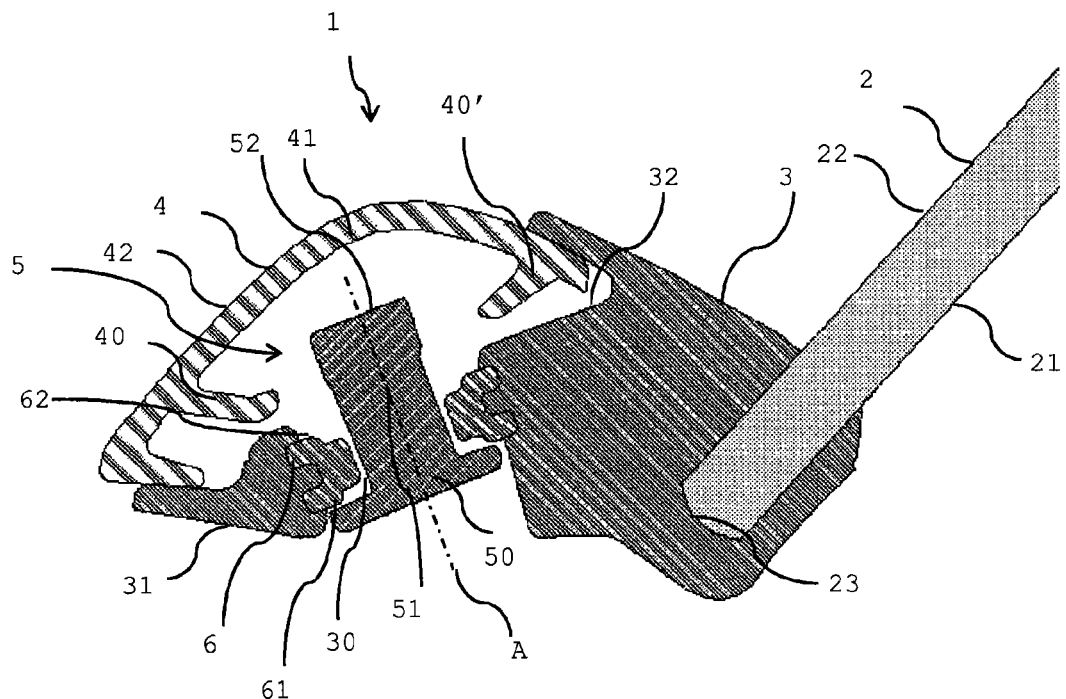
FIG. 1 is a cross-section of a window according to the invention when the head of the attachment element is inserted into the hole made in the profiled bead.
Figure 2:
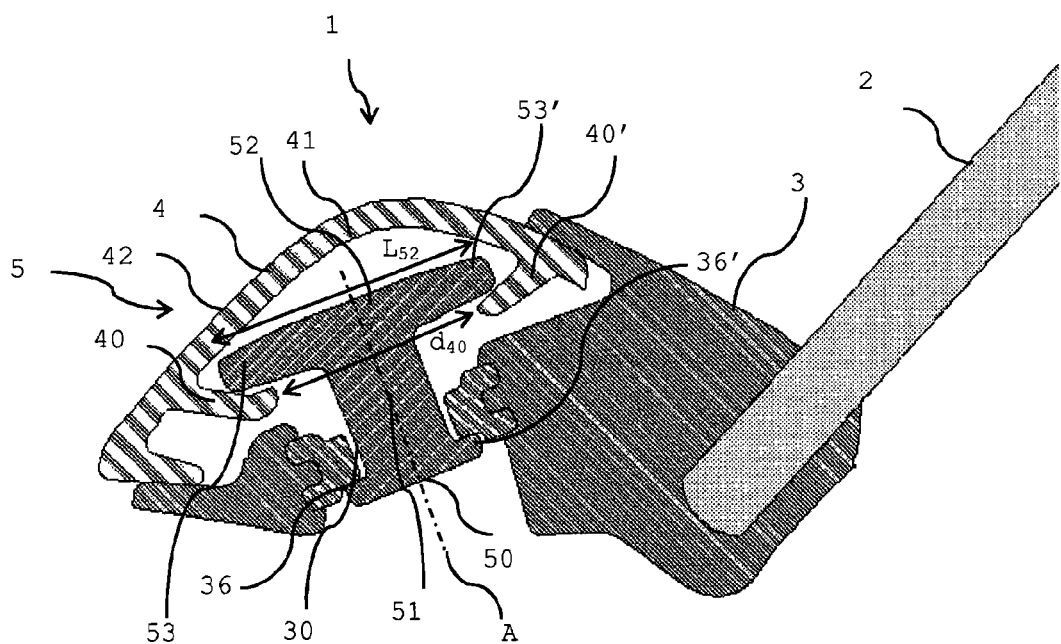
FIG. 2 is a cross-section of the same window as in FIG. 1 after the attachment element has been turned about itself to hold the insert by the retaining flanges thereof.

The present invention relates to a window 1, and in particular a vehicle window as shown in FIGS. 1 and 2, comprising a glazing element 2, at least one profiled joint portion 3 attached to the glazing element, at least one insert 4 such as a trim element, and at least one attachment element 5 for attaching said insert 4 to said profiled joint portion 3 and therefore to the window.

The window 1 according to the invention, as shown in FIGS. 1 and 2, is a fixed side rear window of a car (rear quarter glass). It includes a glazing element 2 fitted with a portion of a profiled bead 3 made of a soft polymer that entirely surrounds the glazing element 2.

The window 1, which may include one or more accessories and in particular one or more window attachment accessories, is designed to fill an aperture, separating a space inside the vehicle from a space outside the vehicle. The glazing element 2 therefore has an inside face 21, designed to be oriented towards the inside space, an outside face 22 designed to be oriented towards the outside space, and a perimeter edge 23.

The glazing element may be monolithic, i.e. made of a single sheet of a single material, or composite, i.e. made of several sheets of material between which at least one layer of adherent material is inserted in the case of laminated glass. The sheet or sheets of material may be mineral, in particular glass, or organic, in particular plastic.

In the case of a vehicle window, at least part of the perimeter of the window usually has a decorative strip (not shown).

If the glazing element is made of organic material, it is manufactured before implementation of the invention by molding the constituent material of the glazing element in a molding device comprising a mold comprising at least one fixed mold part and one movable mold part that is movable in relation to the fixed mold part, said mold parts cooperating when the mold is closed, during the molding stage, to form a molding cavity with a cross-section in the shape of the cross-section of the glazing element. Glazing elements made of organic material are often not flat but concave.

If the glazing element is made of mineral material, it is manufactured before implementation of the invention by melting the mineral material into a flat sheet, then cutting this sheet and potentially curving and/or dip-coating this sheet.

In FIGS. 1 and 2, the glazing element 2 is a monolithic window.

The window shown in FIG. 1 is a fixed window, but the present invention can also be applied to a movable window.

The portion of the profiled joint 3 thus has an inside part 31 that is designed to be oriented towards the inside of the vehicle, and an outside part 32 that is designed to be oriented towards the outside of the vehicle.

The polymer used to make the profiled bead 3 may be a thermoplastic (PVC, TPE, etc.), a polyurethane or even EPDM synthetic rubber, or any other suitable material.

The profiled bead 3 is manufactured using a manufacturing method known as "encapsulation" because it involves a molding stage of the profiled bead 3 in a molding device, between two molding elements, one molding element receiving the inside face of the window and one molding element receiving the outside face of the window, these two molding elements being closed onto one another during the molding stage, leaving a molding cavity therebetween that is filled with the material used to make the profiled bead during the molding stage of this bead.

The profiled bead 3 is preferably arranged on the entire perimeter of the window 1, but this profiled bead could indeed be placed only on a part of the perimeter of the window or on any part of the window.

In these FIGS. 1 and 2, the insert 4 thus covers a portion of the surface of the outside part 32 of the profiled joint.

The part of the profiled bead 3 visible from outside the vehicle is covered by the insert 4, in this case comprising a trim profile, to improve the aesthetic appearance of the window.

The insert is prefabricated: it is manufactured, and possibly shaped, before being attached to the window. It may be made of aluminum, aluminum alloy, steel and in particular stainless steel, plastic and in particular plastic reinforced with fillers such as silica-based minerals or glass fibers. It may also be made in several parts, potentially with different materials in at least two parts.

Given that the fixed rear window is positioned substantially vertically, the insert is extended along the width of the vehicle and simultaneously on the right- and left-hand sides of the vehicle. The insert thus has a complex shape: it has an overall arc or U shape with a central part and a return part at each extremity of the central part, these return parts extending in the same direction: one on the left-hand side of the vehicle and the other on the right-hand side of the vehicle.

According to the invention, the attachment element 5 has a base 50, a head 52 and a body 51 arranged between this base and this head, in which:
the body 51 is no wider than the width $l_{30}$ of the hole 30,
the head 52 is narrower than the width $l_{30}$ of the hole 30 in a first direction corresponding in this case to the width of the insert and shorter than the length $L_{30}$ of the hole 30 while being longer than the width $l_{30}$ of the hole 30 in a second direction corresponding in this case to the length of the insert, so that the head can pass completely through the hole 30 and
the base 50 is wider than the width $l_{30}$ of the hole both in said first direction and in said second direction, so that the base cannot pass through the hole 30 at all
the width $l_{52}$ of the head 52 is less than the distance $d_{40}$ between the lateral extremities of the retaining flanges 40, 40' such that it can pass between these two flanges and
the length $L_{52}$ of the head 52 is greater than the distance $d_{40}$ between the lateral extremities of the retaining flanges 40, 40' such as to hold the flanges, and therefore the insert, in the direction of the outside surface 32 of the profiled bead.

In this case, the first direction and the second direction considered are in the same plane and are perpendicular in this plane.

The length of the hole 30 is not shown in FIGS. 1 and 2; it is the width that is shown. The length of the hole is measured along the length of the insert.

If the body 51 is as wide as the width $l_{30}$ of the hole 30, it means that when the attachment element is rotated the outside walls of the body rub against the adjacent walls of the hole 30, which is not necessarily a problem.

Figure 3:
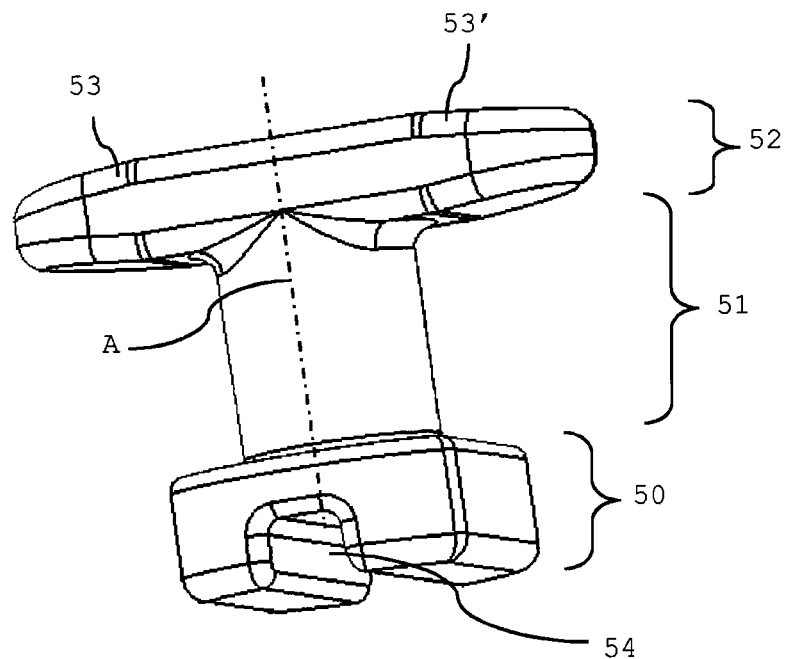
FIG. 3 is a perspective view of the attachment element used in FIGS. 1 and 2.

An example embodiment of an attachment element 5 according to the invention, for assembling the insert 4 on a portion of the profiled bead 3, is shown in FIG. 3. In this embodiment of the invention, which is shown in FIGS. 1 to 3, the attachment element is a plastic clip made by molding.

Comparing FIGS. 1 and 2 shows that:
in a first vertical section of the attachment element 5, shown in FIG. 1, the head 52 is substantially as wide as the body 51 and the base 50 is wider than the body 51 such that the vertical cross-section of said attachment element 5 in this section is an inverted T shape; thus, it is possible to pass the head 52 and part of the body 51 through the hole 30, but it is not possible to pass the base 50 through because the base is wider than the width of the hole;
in a second vertical section of the attachment element 5, shown in FIG. 2 and that is perpendicular to the first, the base 50 and the head 52 are both wider than the body 51 such that the vertical cross-section of said attachment element 5 in this first section is I-shaped; thus, the attachment element can turn about itself and the head 52 can move above the flanges 40, 40' to hold them in the direction of the outside surface 32 of the profiled bead and it is not possible to pass the base 50 through because the base is wider than the width of the hole.

This FIG. 2 shows more specifically that the distance between the head and the base of the attachment element is such that the head holds the insert against the outside surface 32, bearing against the inside surface 31 via the base of the inside perimeter of the hole 30.

In this position, the attachment element is continuously subject to internal tensile stresses, which guarantees the longevity of the attachment.

To prevent the return rotation of the attachment element, it is preferable that the inside surface 31 of the hole 30 has two recesses 36; 36' facing one another across the width of the hole 30; thus, these recesses keep the base 50 in the same position in the space by preventing the base 50 from turning, thus causing the head 52 to release the flanges 40, 40'.

With regard to the method for manufacturing the profiled bead, it may be difficult to form a hole with the required precision.

In this case, it is then preferable to use a perimeter part 6 which forms the perimeter of the hole 30, both on the inside surface 31 and on the outside surface 32 and between these two surfaces.

Advantageously, the perimeter part can be molded at the same time as the profiled bead 3, by placing a perimeter part 6 in the for encapsulation in the appropriate place before injection of the material used to form the profiled bead. The perimeter part 6 can for example be made of a metal or a metal alloy.

If the perimeter part 6 is used, it is preferable that it be this part that includes the equivalent of the recesses 36, 36'.

In this case, to obviate the need to specify an above/below direction for the part 6 when it is inserted in the mold, it is preferable that the perimeter part 6 has two opposing recesses on the inside surface 61 and two opposing recesses 66; 66' on the outside surface 62.

To install the trim element, it must first be placed, as shown in FIG. 1, above the profiled bead 3 and pressing down against the outside surface 32 of the profiled bead.

Figure 4:
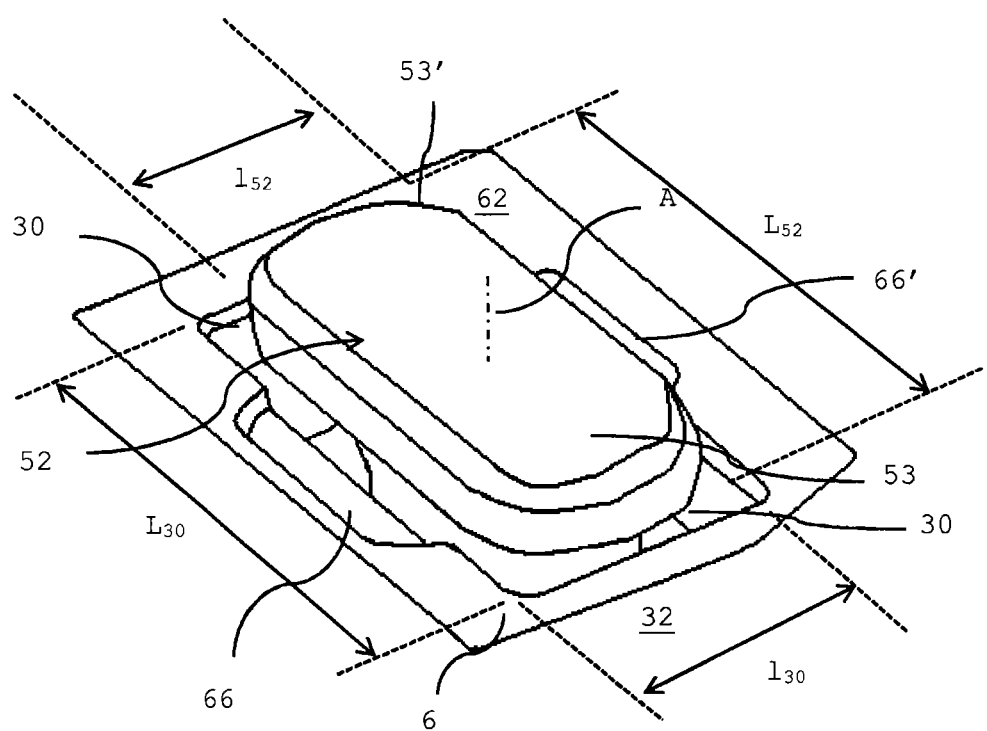
FIG. 4 is a perspective view corresponding to FIG. 1, showing a partial top view of the profiled bead, without the insert.

The attachment element 5 must then be taken and the head 52 inserted into the hole 30, by inserting the head 52 via the inside surface 31 so that it comes out via the outside surface 32. To do so, the branches 53 must be positioned correctly in relation to the hole 30, as shown in FIG. 4.

Figure 5:
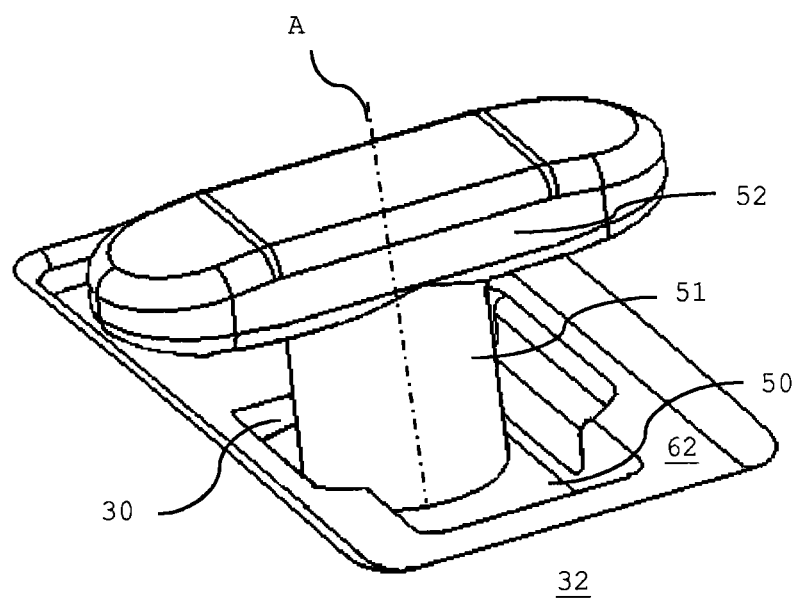
FIG. 5 is a perspective view corresponding to FIG. 2, showing a partial top view of the profiled bead, without the insert.

The attachment element 5 should then be turned about itself about the axis A thereof, in this case by an angle of 90° as shown in FIG. 5, holding the base 50 against the inside surface 31. In doing so, each branch 53, 53' is then positioned above each flange, respectively 40, 40', thereby locking the trim element; it is no longer possible to pull the trim element upwards (in the figures) because the branches resist this movement.

Thus, the head 52 cannot pass through the hole 30 unless the branches 53, 53' are aligned along the length of the hole 30; on the other hand, if the attachment element 5 is turned through 90° in relation to this position, the branches 53, 53' cannot pass through the hole 30.

To facilitate rotation of the attachment element about itself, it is possible to provide, beneath the base 50, a slot 54 in which the end of a screwdriver can be inserted, for example.

FIGS. 1 and 2 show that the hole 30 is located beneath the flanges 40, 40', with the axis thereof being substantially equidistant from the extremities of the flanges and the branches 53, 53' are the same length and symmetrical with one another in relation to a plane passing through the axis A. It is therefore possible to turn the attachment element in one direction or the other about the axis A; there is no preferred direction.

The invention claimed is:

1. A window comprising:
   a glazing element;
   at least one profiled joint portion;
   at least one insert or a trim element; and
   at least one attachment element for attaching the insert to the profiled joint portion, the insert including an internal face with retaining flanges;
   wherein the profiled joint portion includes, beneath the insert, at least one hole opening onto an inside surface and an outside surface of the profiled joint portion, the hole being longer than it is wide;
   wherein the attachment element includes a base, a head, and a body arranged between the base and the head, in which
      the body is no wider than a width of the hole,
      the head is narrower than the width of the hole in a first direction and shorter than a length of the hole, while being longer than the width of the hole in a second direction,
      the base is wider than the width of the hole in the first direction and in the second direction, and
      the first direction and the second direction are in a same plane or perpendicular in a same plane,
   wherein a length of the head is greater than a distance between lateral extremities of the retaining flanges such that the head holds, along the length thereof, the retaining flanges in a direction of the outside surface of the profiled joint portion,
   wherein the attachment element includes a vertical axis passing though the base, the body, and the head,
   wherein, in a first section of attachment element taken in a plane of the vertical axis and a width direction of the attachment element, the base extends in the width direction of the attachment further than the head and the body, and
   wherein, in a second section of the attachment element perpendicular to the first section and taken in a plane of the vertical axis and a length direction of the attachment element, the base extends in the length direction of the attachment further than body, and the head extends in the length direction of the attachment further than base.

2. The window as claimed in claim 1, wherein a cross-section of the body perpendicular to the vertical axis is circular.

3. The window as claimed in claim 1, wherein the inside surface of the hole includes two recesses, or two recesses facing one another across the width of the hole.

4. The window as claimed in claim 1, wherein the hole has a perimeter made of a perimeter part that is separate from the profiled joint portion.

5. The window as claimed in claim 4, wherein the perimeter part includes two recesses on an inside surface, or two recesses on the inside surface facing one another across the width of the hole, and two recesses on an outside surface, or two recesses on the outside surface facing one another across the width of the hole.

6. The window as claimed in claim 1, wherein the insert has an overall arc or U shape with a central part and a return part at each extremity of the central part.

7. An attachment element for a window comprising a glazing element, at least one profiled joint portion, at least one insert or a trim element, the insert including an internal face with retaining flanges, wherein the profiled joint portion includes, beneath the insert, at least one hole opening onto an inside surface and an outside surface of the profiled joint portion, the hole being longer than it is wide, the attachment element comprising:
   a base, a head, and a body arranged between the base and the head, the body being no wider than a width of the hole, the head being narrower than the width of the hole in a first direction and shorter than a length of the hole, while being longer than the width of the hole in a second direction, the base being wider than the width of the hole in the first direction and in the second direction, and the first direction and the second direction being in a same plane or perpendicular in a same plane,
   wherein a length of the head is greater than a distance between lateral extremities of the retaining flanges such that the head holds, along the length thereof, the retaining flanges in a direction of the outside surface of the profiled joint portion,
   wherein the attachment element includes a vertical axis passing though the base, the body, and the head,
   wherein, in a first section of the attachment element taken in a plane of the vertical axis and a width direction of the attachment element, the base extends in the width direction of the attachment further than the head and the body, and
   wherein, in a second section of the attachment element perpendicular to the first section and taken in a plane of the vertical axis and a length direction of the attachment element, the base extends in the length direction of the attachment further than body and the head extends in the length direction of the attachment further than base.

8. A method for manufacturing a window, the window including a glazing element, at least one profiled joint portion, at least one insert or a trim element, and at least one attachment element for attaching the insert to the profiled joint portion, the insert including an internal face with retaining flanges, wherein the profiled joint portion includes, beneath the insert, at least one hole opening onto an inside surface and an outside surface of the profiled joint portion, the hole being longer than it is wide, wherein the attachment element includes a base, a head, and a body arranged between the base and the head, in which the body is no wider than a width of the hole, the head is narrower than the width of the hole in a first direction and shorter than a length of the hole, while being longer than the width of the hole in a second direction, the base is wider than the width of the hole in the first direction and in the second direction, the first direction and the second direction are in a same plane or perpendicular in a same plane, wherein a length of the head is greater than a distance between lateral extremities of the retaining flanges such that head holds, along the length thereof, the retaining flanges in a direction of the outside surface of the profiled joint portion, the method comprising:
  passing the head of the attachment element through the hole of the profiled joint portion, and
  after the passing, turning the attachment element about itself.

9. The method as claimed in claim 8, wherein the passing the head through the hole, includes inserting the head into the hole via the inside surface to come out of the hole via the outside surface.

10. The method as claimed in claim 8, wherein the turning the attachment element about itself includes turning the attachment element by an angle of 90°.

11. A window comprising:
  a glazing element;
  at least one profiled joint portion;
  at least one insert or a trim element; and
  at least one attachment element for attaching the insert to the profiled joint portion, the insert including an internal face with retaining flanges;
  wherein the profiled joint portion includes, beneath the insert, at least one hole opening onto an inside surface and an outside surface of the profiled joint portion, the hole being longer than it is wide;
  wherein the attachment element includes a base, a head, and a body arranged between the base and the head, in which
    the body is no wider than a width of the hole,
    the head is narrower than the width of the hole in a first direction and shorter than a length of the hole, while being longer than the width of the hole in a second direction,
    the base is wider than the width of the in the first direction and in the second direction,
    the first direction and the second direction are in a same plane or perpendicular in a same plane,
  wherein a length of the head is greater than a distance between lateral extremities of the retaining flanges such that the head holds, along the length thereof, the retaining flanges in a direction of the outside surface of the profiled joint portion, and
  wherein the body has an axis and the cross-section perpendicular to the axis is circular.

12. The window as claimed in claim 11, wherein the inside surface of the hole includes two recesses, or two recesses facing one another across the width of the hole.

13. The window as claimed in claim 11, wherein the hole has a perimeter made of a perimeter part that is separate from the profiled joint portion.

14. The window as claimed in claim 13, wherein the perimeter part includes two recesses on an inside surface, or two recesses on the inside surface facing one another across the width of the hole, and two recesses on an outside surface, or two recesses on the outside surface facing one another across he width of the hole.

15. The window as claimed in claim 11, wherein the insert has an overall arc or U shape with a central part and a return part at each extremity of the central part.

\* \* \* \* \*